United States Patent Office
3,557,261
Patented Jan. 19, 1971

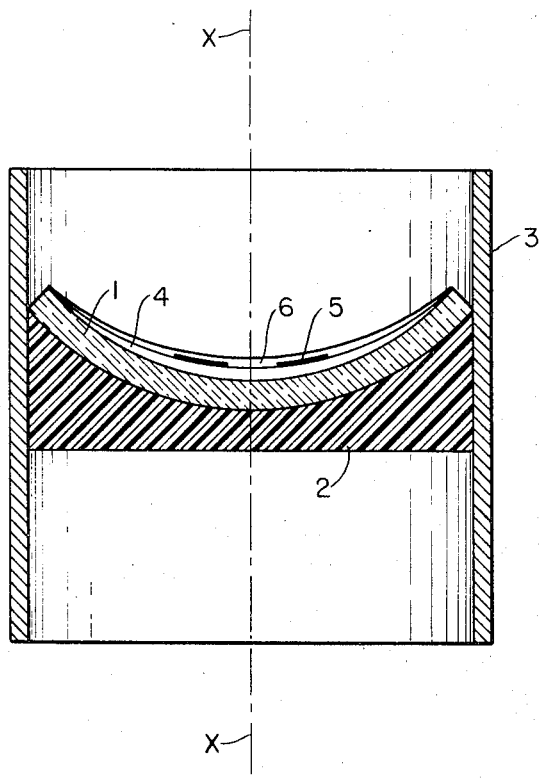

3,557,261
METHOD OF CENTRIFUGALLY CASTING LAYERED CONTACT LENSES
Otto Wichterle, Prague, Czechoslovakia, assignor to Ceskoslovenska akademie ved, Prague, Czechoslovakia
Continuation-in-part of applications Ser. No. 593,643, Nov. 14, 1966, and Ser. No. 423,034, Jan. 4, 1965. This application Oct. 5, 1967, Ser. No. 673,026
Int. Cl. B29d 11/00; G02c 7/04
U.S. Cl. 264—1
4 Claims

ABSTRACT OF THE DISCLOSURE

A mixture of ethyleneglycol monomethacrylate with a little ethyleneglycol dimethacrylate is polymerized in a mold rotating about an axis perpendicular to a spherically concave mold face to form a shape-retaining hydrophilic polymer layer. A very thin layer of opaque matter is deposited on the exposed polymer face and covered with a second layer of the same polymer. The opaque material may simulate the iris, pupil, and/or sclera of an eye when the laminar product is ultimately swelled by contact with physiological saline solution prior to use as a soft contact lens or as part of an artificial eye.

REFERENCE TO COPENDING APPLICATIONS

This application is a continuation-in-part of my copending applications Ser. No. 593,643, filed Nov. 14, 1966, now abandoned, and Ser. No. 423,034, now U.S. Pat. No. 3,408,429 filed Jan. 4, 1965, the latter being itself a continuation-in-part of my earlier application Ser. No. 393,-505, filed Sept. 1, 1964, now abandoned.

BACKGROUND OF THE INVENTION

This invention relates to improvements in soft contact lenses and artificial eyes made from hydrogels consisting essentially of water and sparingly cross linked hydrophilic polymers, and particularly to partly opaque opthalmic devices such as contact lenses and artificial eyes.

The materials for the ophthalmic devices with which this invention is more particularly concerned have been disclosed in Pats. No. 2,976,576 and 3,220,960. A typical representative of the hydrophilic polymers suitable for use in making the ophthalmic devices is copolymer of ethyleneglycol monomethacrylate with a very small amount of ethyleneglycol dimethacrylate. The hydrogels of the polymer are distinguished by their excellent transparency and lack of color.

They can be colored by dispersing pigments in the polymerization mixture or by contact of the hydrogel with solutions of water soluble dyes. However, at least some coloring matter is present on the surface of the colored hydrogels dyed by means of aqueous solutions, and also if pigments are admixed to the polymerization mixture, and polymerization is carried out in a quickly rotating mold, as disclosed in my last-mentioned copending application. The specific gravity of the pigments is normally much higher than that of the fluid polymerization mixture, and the pigment particles are driven to the surface by centrifugal forces. The presence of coloring matter at the surface is undesirable from the point of view of appearance and because of possible harmful long-range effects on adjacent human tissue during use of the ophthalmic device. The appearance of a natural eye cannot be simulated closely unless opaque matter present is covered by a layer of transparent material.

It has been proposed heretofore to form insoluble coloring matter within a hydrogel of the invention by reaction between solutions diffused into the interior from different surfaces. While the method gives good results, it is very limited in the range of available colors and in the colored patterns that can be produced.

The present invention aims at providing opthalmic devices mainly consisting of the afore-mentioned hydrogels which are provided with opaque material that may be chosen at will as to color and pattern to simulate the appearance of a natural eye.

SUMMARY OF THE INVENTION

In one of its aspects the invention resides in an ophthalmic device, more specifically a contact lens or a part of an artificial eye, in which a layer of opaque matter is interposed between two integrally bonded layers of the afore-described hydrogel whose polymer is physiologically inert and thus protects adjacent sensitive human tissue against any harmful effects the opaque matter might otherwise have during extended use of the device. The opaque matter must be insoluble in water, but may otherwise be selected at will. One of the hydrogel layers constitutes a convex surface of the device.

The invention also resides in a method of preparing the laminar ophthalmic device in which a mold having a concave wall is rotated about an axis transverse of that wall while the mold contains a polymerizable mixture of a water-soluble monoester of acrylic or methacrylic acid with a small amount of a water soluble diester of one of these acids, and the mixture is maintained under known conditions of temperature, exclusion of oxygen and the like, which permit polymerization, until a first shape retaining polymer having an exposed, at least partly concave face is formed. Opaque, water-insoluble matter is deposited on that face in a layer substantially thinner than the polymer layer, and is covered with additional polymerizable mixture which is converted into a second layer of polymer. The layer of opaque material permits direct contact of the first polymer with the latter applied covering mixture so that the two layers of polymer are integrally bonded to each other by the polymerization of the second layer. The laminar structure so produced is removed from the mold and contacted with an aqueous liquid until the structure reaches osmotic equilibrium with the liquid which may be physiological saline solution or any other inert aqueous liquid having the same osmotic pressure.

Other features, and many of the attendant advantages of the invention will readily become apparent from the following detailed description of preferred embodiments and from the drawing attached in which the single figure shows schematically a cross section of a suitable mold for practicing the present invention and the lenses prepared therein.

DESCRIPTION OF THE PREFERRED EMBODIMENTS

The following examples are further illustrative of this invention, and it will be understood that the invention is not limited thereto.

EXAMPLE 1

A polymerizable mixture was prepared from the following materials (parts by weight):

Ethyleneglycol monomethacrylate _____ 65.5
Ethyleneglycol bismethacrylate _____ 0.4
Acrylamide _____ 1.0
Glycerol _____ 33.0
Diisopropyl percarbonate _____ 0.1

40 milligrams of the mixture were poured into the glass mold 1 such as shown in the figure whose cavity was a segment of a sphere having a radius of 6.5 mm. and had a horizontal open top of 11.5 mm. diameter. The glass mold 1 is supported on a resin bed 2 secured within a metallic cylindrical housing 3 which itself is supported in conventional manner for rotation at least about its central axis X—X. The mold was rotated about its vertical axis at 425 r.p.m. while its contents were heated to 67° C. by a stream of hot nitrogen.

When the mold was stopped after 15 minutes, it contained a clear, shape retaining, polymeric gel layer 4 whose convex face conformed to the spherically curved mold face and was practically coextensive therewith, and whose inner face had the approximate concave shape of a paraboloid of rotation.

A coaxial ring 5 having an outer diameter of 6.5 mm. and an inner diameter of 2 mm. was painted through a stencil on the concave surface with a fine brush dipped in conventional India ink, and was permitted to dry for about two minutes.

The mold was then again rotated at 425 r.p.m., 30 mg. more of the polymerizable mixture were metered into the mold cavity, and heating was resumed for 15 minutes forming the upper layer 6.

The mold and its contents were submersed in warm water until the polymeric body swelled sufficiently to be released from the mold. It was removed from the mold cavity and carefully washed with water until the glycerin was completely replaced by water. The soft hydrogel lens so obtained was immersed in physiological saline solution in which it reaches its final shape and size in osmotic equilibrium with body tissues.

The lens was optically homogeneous except for an embedded black ring. The two consecutively formed polymer layers 4 and 6 were fused into a unitary body whose cohesive strength was not measurably reduced by the pigment ring 5. When the lens was applied to a human eye in the usual manner, the black ring gave the appearance of an enlarged pupil that can normally be achieved only by means of atropine. The small central opening in the ring increased the depth of focus of the eye and thereby improved vision of an eye which could not benefit from the usual correction of refraction error and astigmatism.

EXAMPLE 2

An outer layer of a contact lens was prepared as described in Example 1. A printing block having a surface conforming to the concave surface of the plastic gel layer was prepared from soft wood, and a pattern of overall annular shape simulating the pattern of lines in a human iris was cut into its convex face by means of a fine engraver's needle. The engraved face was wiped with grey, water-based artist's paint and then pressed on the concave face of the lens layer in the mold, thereby transferring the grey paint to the plastic gel surface. After the paint had dried partly by evaporation and partly by diffusion of water and water soluble ingredients into the gel, it was covered with a painted ring of greenish blue printing ink.

After a few minutes, additional monomer mixture was poured into the mold and the lens was finished as described in Example 1. The lens was optically homogeneous with the exception of an annular central area in which a gray pattern on a greenish blue background closely simulated the appearance of a human iris. The cosmetic effect produced was pleasing, and suitable for changing the apparent eye color of the wearer or for hiding a defect in the natural iris such as may be found after certain operations on the eye.

Upon microscopic examination, minute oil droplets originating in the ink base were found trapped between the two integrally bonded transparent gel layers. They did not migrate toward the surface during the long period during which the lens was kept under observation. The soluble ingredients of the gray paint were removed during the washing operation together with the glycerol.

EXAMPLE 3

A thin layer of sparingly cross-linked polymer gel was prepared from the monomer mixture of Example 1 in a ground and polished glass mold whose cavity had a radius of curvature of 9.3 mm. and a horizontal circular rim 19 mm. in diameter and was formed with a central depression having a radius of curvature of 6 mm. and a maximum diameter of 9.5 millimeter. The mold was rotated about its vertical axis at 455 r.p.m. during polymerization under a heated nitrogen blanket.

The annular concave surface of the thin polymer layer so produced which extended about the central depression in the mold was imprinted with the pattern of blood vessels usually visible in the sclera about the cornea by means of an engraved polymethylmethacrylate block, as described in Example 2, the grooves in the block being charged with English Red (a commercial red pigment).

After the imprint was at least partly dried, the annular portion of the polymer was covered with a suspension of very finely ground titanium dioxide (rutile) in seven parts by weight of an ethanol solution of a linear polymer of ethyleneglycol monomethacrylate as a carrier.

The central depression in the mold, occupied only to a small part by the polymeric gel initially prepared, was next filled to its rim with the monomer mixture of Example 1 which was allowed to polymerize while the mold stood still. The image of the iris and of the pupil was cut from a full size color picture of a human eye on photographic film. The film was soaked in water to swell the emulsion which could then be separated from the film base by means of a sharp blade, and was transferred to the flat plastic gel surface in the center of the mold.

Additional polymerizable mixture was then introduced into the mold which was kept stationary during the ensuing polymerization period. The unitary polymer body so obtained had an outer face closely similar in appearance to a natural eye and was used as the essential part of an artificial eye.

The image of an iris on positive color film was also employed in a modification of the method of Example 1, the annular foil of emulsion carrying the image of the iris, but having a hole instead of a pupil, was placed coaxially on the exposed concave face of the first layer of polymer gel instead of the ink layer and dried before it was covered with another portion of the monomer mixture. The product was similar to that of Example 2.

EXAMPLE 4

The outer layer of a contact lens was prepared as described in Example 1. A mica leaf having a thickness of 10 microns was coated with silver in a vacuum in a conventional manner, and a piece 1 mm. x 1 mm. was cut from the silver coated leaf. The minute mirror so obtained was attached to the concave surface of the polymer in the mold off-center by means of a droplet of a 3% polyvinyl alcohol solution which was then dried at 100° C. for 5 minutes.

A second polymeric gel layer was formed in the mold from 40 mg,. of the monomer mixture at a rotary mold speed of 400 r.p.m. The lens was washed with water as described in Example 1, and brought to osmotic equilibrium with physiological saline solution. When swelled to its final shape and size, it was practically afocal. It was used successfully in the investigation of eye movements in which the reflection of a light beam from the silver mirror on a screen was recorded by a motion picture camera.

EXAMPLE 5

A mold of the type described in Example 3 having a central depression of 10 mm. diameter and 7.5 mm. radius of curvature and an annular peripheral face of 9.5 mm. radius of curvature and 19 mm. diameter, and having a sharp edge at its outer rim, was rotated at 400 r.p.m. while charged with 150 mg. of the monomer mixture of Example 1, and while being heated by a hot stream of nitrogen.

Images of the iris and of the sclera were produced on the central and peripheral portions of the exposed concave polymer face as described in Examples 2 and 3 respectively. After drying of the pigment layers, a central spot in the depression was masked with a small circular piece of cardboard, and the remainder of the colored polymer surface was coated with a layer of India ink sprayed from a small air brush.

After drying of the ink layer, the cardboard mask was removed from the clear central spot of the plastic layer, and a second plastic gel layer was formed from 120 mg. of the same monomer mixture at a rotary mold speed of 410 r.p.m. in a hot nitrogen stream as in Example 1.

The contact lens so obtained appeared impervious to light except for a central pupil opening. Yet, the two layers of polymeric gel which mainly constituted the lens were joined to each other so firmly that the lens could not be split along the pigment layers. The lens gave good protection and a satisfactory appearance to the eye of an albino whose refraction error also was corrected.

It appears that water insoluble pigments of any kind may be employed in the method of the invention to produce ophthalmic devices in which a relatively thin layer of colored material is embedded between two thicker layers of a transparent hydrogel consisting essentially of water and of a physiologically inert, infrequently cross-linked hydrophilic polymer in osmotic equilibrium with physiological saline solution. A series of experiments covering all types of printing and writing inks, artist's paints having an aqueous or an oil base, and commercial pigment dispersion in various liquid vehicles used in the production of colored lacquers and industrial paints did not reveal a single instance of a material that could not be employed successfully. When the vehicle contained water-soluble materials, they were removed during the usual washing of the lens. Water insoluble portions of the carrier which were not driven off during drying were embedded as droplets in the lenses or artificial eyes of the invention, but did not interfere with the desired cosmetic or optical effects, did not affect the mechanical strength of the device to a measurable extent, and were safely sealed from contact with any surface of the wearer's body. The pigments themselves were similarly sealed and did not affect the properties of the lenses and artificial eyes. Microscopic examination of transversely cut laminar lenses of the invention indicates that individual pigment particles are sufficiently spaced from each other even in seemingly opaque pigment layers to permit penetration by the monomer mixture and fusing of the two gel layers during the second polymerization step.

The specific nature of the polymer in the hydrogel which constitutes the transparent layers of the ophthalmic devices of the invention is not critical although copolymers of ethyleneglycol monomethacrylate and of small amounts of ethyleneglycol dimethacrylate are preferred at this time because of their outstanding optical qualities. They may be replaced by corresponding esters of acrylic acid. Similarly, the acrylamide listed in Example 1 may be replaced by methacrylamide. Esters of polyhydric alcohols other than ethyleneglycol may be substituted for those specifically enumerated, as more specifically discussed in the afore-mentioned Pat. No. 3,220,960.

It should be understood, therefore, that the foregoing disclosure relates to preferred embodiments of the invention only, and that it is intended to cover all changes and modifications of the examples of the invention herein chosen for the purpose of the disclosure which do not constitute departures from the spirit and scope of the invention set forth in the appended claims.

I claim:
1. A method of producing an ophthalmic device which comprises:
   (a) rotating a mold having a concave wall about an axis transverse of said wall while said mold contains a polymerizable mixture of a water-soluble monoester of acrylic or methacrylic acid with a small amount of a water soluble diester of one of said acids;
   (b) maintaining said mixture in said rotating mold under polymerization conditions until the same forms a first shape-retaining layer of polymer having a unitary exposed face, at least a portion of said face being concave;
   (c) depositing on said exposed face opaque, water insoluble matter in a layer substantially thinner than said layer of polymer;
   (d) covering said layer of opaque matter with a polymerizable mixture of said monoester and of said diester;
   (e) maintaining the last mentioned mixture under polymerization conditions until the same forms a second shape retaining layer of polymer, said layer of opaque matter permitting direct contact of said first polymer layer with said last mentioned mixture, whereby said second layer of polymer is bonded to said first layer;
   (f) removing the laminar structure so produced from said mold; and
   (g) contacting said structure with an aqueous liquid until the structure reaches osmotic equilibrium with said liquid, the osmotic pressure of said liquid being substantially equal to that of physiological saline solution.

2. A method as set forth in claim 1, wherein said mold is rotated about said axis while said last mentioned mixture is maintained under polymerization conditions.

3. A method as set forth in claim 1, wherein said opaque matter is deposited on said surface while suspended in a liquid carrier, at least a portion of said carrier being removed from said surface before said opaque matter is covered by said last mentioned mixture.

4. A method as set forth in claim 3, wherein said carrier is an alcoholic solution of a soluble polymer of ethyleneglycol monomethacrylate.

References Cited

UNITED STATES PATENTS

| 3,010,153 | 11/1961 | Bittner | 264—1 |
| 3,408,429 | 10/1968 | Wichterle | 264—1 |

FOREIGN PATENTS

| 699,736 | 11/1953 | Great Britain | 351—160 |
| 883,213 | 11/1961 | Great Britain | 264—1 |
| 1,004,424 | 9/1965 | Great Britain | 264—1 |
| 1,370,642 | 7/1964 | France | 264—1 |
| 882,004 | 7/1953 | Germany | 264—1 |

DONALD J. ARNOLD, Primary Examiner

A. H. KOECKERT, Assistant Examiner

U.S. Cl. X.R.

260—41; 264—311; 351—162